United States Patent [19]

Grasso et al.

[11] Patent Number: 4,938,561
[45] Date of Patent: Jul. 3, 1990

[54] OPTICAL SIGNAL AMPLIFICATION WITH COUPLED FIBERS AND OPTICAL PUMPING ENERGY

[75] Inventors: Giorgio Grasso, Monza, Italy; Eleanor J. Tarbox; Paul L. Scrivener, both of Southampton, England

[73] Assignee: Pirelli General plc, London, United Kingdom

[21] Appl. No.: 291,636

[22] Filed: Dec. 29, 1988

[30] Foreign Application Priority Data

Jan. 12, 1988 [IT] Italy ............................... 19037 A/88

[51] Int. Cl.$^5$ .............................................. G02B 6/22
[52] U.S. Cl. ............................. 350/96.33; 350/96.15; 350/96.29; 372/6
[58] Field of Search ................. 350/96.15, 96.29, 96.3, 350/96.33, 96.34; 372/6, 20, 39

[56] References Cited

U.S. PATENT DOCUMENTS

| | | | |
|---|---|---|---|
| 4,015,217 | 3/1977 | Snitzer | 372/6 |
| 4,044,315 | 8/1977 | Snitzer | 372/6 X |
| 4,136,929 | 1/1979 | Suzaki | 350/96.15 |
| 4,515,431 | 5/1985 | Shaw et al. | 350/96.15 |
| 4,531,811 | 7/1985 | Hicks, Jr. | 350/96.33 |
| 4,546,476 | 10/1985 | Shaw et al. | 372/6 |
| 4,553,238 | 11/1985 | Shaw et al. | 372/6 |
| 4,723,824 | 2/1988 | Shaw et al. | 350/96.15 |
| 4,730,886 | 3/1988 | Hicks | 350/96.15 |
| 4,742,307 | 5/1988 | Thylén | 350/96.15 X |
| 4,780,877 | 10/1988 | Snitzer | 372/6 |
| 4,782,491 | 11/1988 | Snitzer | 372/6 |

FOREIGN PATENT DOCUMENTS 0103382 3/1984 European Pat. Off. .

Primary Examiner—William L. Sikes
Assistant Examiner—John Ngo
Attorney, Agent, or Firm—Brooks Haidt Haffner & Delahunty

[57] ABSTRACT

An optical fibre structure usable in amplifying optical signals, comprising a length of optical fibre (1) which includes two uniformally spaced monomode optical cores (2,4) located within a common cladding (6) so as to provide two optical guidance paths, the optical characteristics of at least the cores being different such as to give the two guidance paths different propagation constants the values of which coincide for a predetermined coupling wavelength, one of the cores including a fluorescent material capable of producing stimulated emission. There is also disclosed a method of amplifying an optical signal using such an optical fibre structure, comprising arranging for the wavelength ($\lambda_s$) of the optical signal, the fluorescent wavelength of said material in said one core, and said predetermined coupling wavelength all to be substantially the same, launching optical pump energy having a different wavelength ($\lambda_p$) into said one core to pump the fluorescent material, launching the optical signal into the other core so that the optical signal transfers repeatedly between the two cores due to optical coupling and, when in said one core, gives rise to stimulated emission substantially at its own wavelength from the fluorescent material thereby becoming amplified, and extracting the amplified optical signal from the fibre structure when it is in said other core. A device (FIG. 4) using this method is also disclosed.

18 Claims, 3 Drawing Sheets

OPTICAL SIGNAL AMPLIFICATION WITH COUPLED FIBERS AND OPTICAL PUMPING ENERGY

This invention relates to amplifying optical signals.

It was proposed in articles starting on pages 84 and 90 of the Journal of The Optical Society of America A/Vol. 2, No. 1/January 1985 to use a two-core optical fibre for amplifying an optical signal. The proposed method involved launching the optical signal into one core of the fibre and launching optical pump energy into the other core. The two cores were to differ in radius and/or refractive index so that the respective guidance paths which they defined would have different propagation constants. In particular, the propagation constants of the two cores would vary differently with wavelength, so that they would only be identical at one wavelength. The design was to be arranged so that that wavelength would correspond with the wavelength of the optical signal and hence through the known principle of optical coupling, repeatedly transfer between the two cores.

Amplification of the optical signal was to be achieved by non-linear effects such as three-wave mixing or stimulated Raman scattering, occurring at those regions where both the signal and the pump energy were present in the same core. The optical pumping energy was to be at wavelengths above 1000 nm and would need to be provided at a very high power level in order for the desired non-linear effects to operate.

The present invention aims to enable the use of lower pump energies, and also enable the use of lower wavelength pump energy, so that cheaper, more reliable, more economical and more readily available semiconductor sources can be used to supply the pump energy. To these ends, the invention uses stimulated emission in a core containing fluorescent material, for example a rare earth doped core.

From one aspect, the invention provides an optical fibre structure usable in amplifying optical signals, comprising a length of optical fibre which includes two uniformly spaced monomode optical cores located within a common cladding so as to provide two optical guidance paths, the optical characteristics of at least the cores being different such as to give the two guidance paths different propagation constants the values of which coincide for a predetermined coupling wavelength, one of the cores including a fluorescent material capable of producing stimulated emission.

From another aspect, the invention provides a method of amplifying an optical signal using an optical fibre structure as just defined, comprising arranging for the wavelength ($\lambda_s$) of the optical signal, the fluorescent wavelength of said material in said one core, and said predetermined coupling wavelength all to be substantially the same, launching optical pump energy having a different wavelength ($\lambda_p$) into said one core to pump the fluorescent material, launching the optical signal into the other core so that the optical signal transfers repeatedly between the two cores due to optical coupling and, when in said one core, gives rise to stimulated emission substantially at its own wavelength from the fluorescent material thereby becoming amplified, and extracting the amplified optical signal from the fibre structure when it is in said other core.

In practice, launching light separately into the two cores of a two-core fibre is not simple to achieve but can be done using lenses and/or specially prepared coupling fibres. From a further aspect, the invention aims to provide a device for amplifying an optical signal in which the input and output means are simplified.

From this aspect, there is provided a device for amplifying an optical signal, comprising an optical fibre structure in accordance with the invention as described above, having at at least one end a planar optic element which includes two optical paths which are optically matched with, and are at one end positioned in register with, respective ones of the fibre cores, the two optical paths of the planar element diverging in a direction away from the fibre to provide relatively widely spaced apart optical inputs leading to the fibre cores.

The invention also includes provision for electrically tuning the coupling wavelength between the cores, which enable the coupling wavelength to be brought into coincidence with the signal wavelength if this is not exactly achieved during manufacture of the fibre.

In order that the invention may be more clearly understood, some embodiments thereof will now be described, by way of example, with reference to the accompanying diagrammatic drawings, in which.

Figure 2:
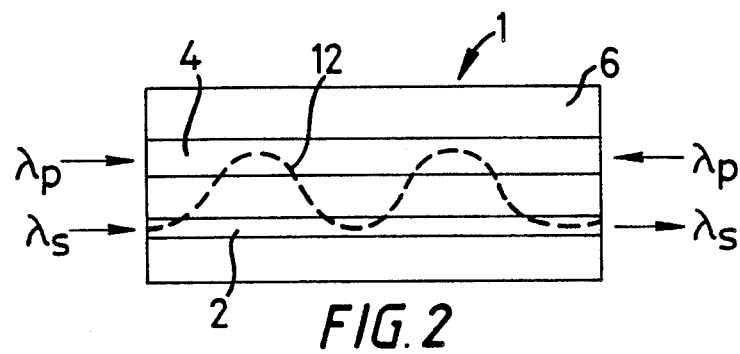
FIG. 2 shows (greatly shortened) an optical fibre having two cores which differ from each other so as to have the different propagation constants illustrated in FIG. 1.

The optical fibre 1 shown in FIG. 2 has two optical cores 2 and 4 located within a common cladding 6. The cores 2 and 4 are uniformly spaced apart throughout the length of the fibre. Each of the cores provides a respective optical guidance path which extends laterally to each side of the core, and the spacing between the cores is made sufficiently small that their optical guidance paths will overlap. The cores 2 and 4 are designed for monomode operation at the wavelength of the optical signal to be amplified.

Figure 1:
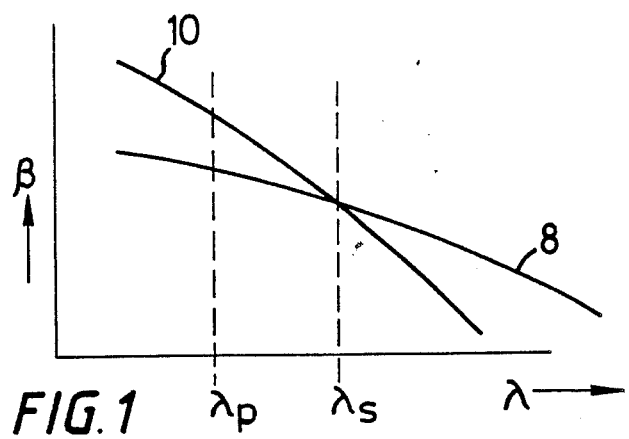
FIG. 1 is a graph showing the different variations with wavelength of the propagation constants of the optical guidance paths of a fibre shown in FIG. 2.

The material, diameter and refractive index profile of each core is selected, in a manner which in itself is known, such that the two cores have different propagation constants. FIG. 1 shows by curve 8 the propagation constant (varying with wavelength) of core 2 and by curve 10 the propagation constant of core 4.

It can be seen from FIG. 1 that the two propagation constants coincide for a wavelength $\lambda_s$. It is known that if light at that wavelength $\lambda_s$ is introduced into one of the cores it will, by the known process of optical coupling which occurs when the propagation constants of the cores are equal, progressively transfer from the original core to the other one, and then back again, repeatedly. In fact, there is a pass-band of wavelengths centred on $\lambda_s$ for which this occurs, the width of the pass-band being dependent on the relative angle of divergence between the curves 8 and 10 which can be controlled by adjusting the characteristics of the cores which have been referred to above.

In the optical fibre structure illustrated in FIG. 2, an optical signal having wavelength $\lambda_s$ equal to the optical coupling centre wavelength is introduced into core 2. The optical coupling effect causes the optical signal to transfer repeatedly from core 2 to core 4 and back as illustrated by the broken line 12 in FIG. 2. In practice, the length of the fibre is likely to be of the order of 1 or 2 meters so that many hundreds of these transfers will occur as the optical signal traverses the length of the fibre.

The other core 4 has incorporated in it a fluorescent material capable of producing stimulated emission at a wavelength equal to or very close to $\lambda_s$. The preferred materials are fluorescent rare earth dopants, and especially erbium, which fluoresces, and produces stimulated emission, at a wavelength between 1530 and 1550 nm, this being sufficiently close to the standard telecommunications optical information transmission wavelength of 1550 nm, that it enables the fibre to be used for amplification at that standard telecommunications wavelength. For operation at other standard telecommunications optical information transmission wavelength such as 850 nm and 1300 nm, the cores must be designed to achieve the appropriate different coupling wavelength, and different dopants must be used.

Other rare earth elements can produce stimulated emission at various different wavelengths, for example neodymium at 1060 nm, and may be used to amplify optical signals at corresponding different wavelengths.

Figure 3:
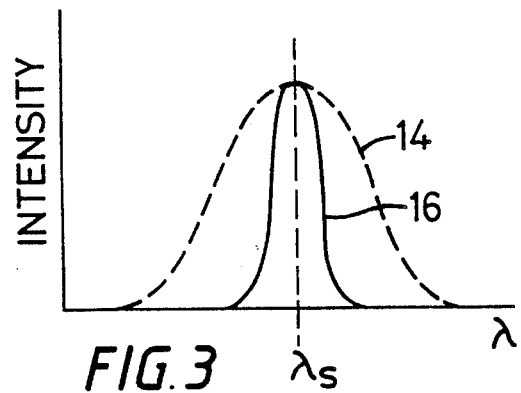
FIG. 3 shows the pass-band for optical coupling, within the fluorescent spectrum, between the cores in the fibre of FIG. 2.

Returning to FIG. 2, optical pump energy at a wavelength $\lambda_p$ smaller than $\lambda_s$ is launched into core 4 at one or both ends depending upon how much amplification is required. The pump energy may or may not be monomode in core 4. The optical pump energy raises electrons of the rare earth material in core 4 to a high energy level, from which they can fall to a lower level thus generating the fluorescent spectrum. The spontaneous fluorescent emission produced just by the application of the pump energy to the core 4 will have a relatively broad spectrum as illustrated by the broken line 14 in FIG. 3 and only the limited quantity falling within the optical coupling pass-band 16 will be able to escape into core 2 through the optical coupling effect. This filtering action significantly reduces noise in the signal core 2 due to the noisy spontaneous emission in the amplifying core 4, relative to the amount of noise present in the output from known single core rare earth doped amplifying fibres.

Additionally, and to a far greater extent, at all the positions where the optical signal at $\lambda_s$ is travelling in core 4 it causes stimulated emission from the pumped rare earth atoms, the stimulated emission being centred on the same wavelength $\lambda_s$ as the spontaneous fluorescent emission just referred to and being coherent with the optical signal which stimulates it. Consequently, the optical signal becomes progressively more amplified as it travels along the length of the fibre. The fibre length is an integral number times the coupling beat length, between the two cores, of optical energy having the telecommunications transmission wavelength 1550 nm, so that at the end of the fibre the amplified optical signal is travelling entirely in core 2 and can therefore be extracted from the fibre free of all spontaneously emitted fluorescent radiation except for that limited amount lying within the pass-band 16. The optical pump energy, being at the smaller wavelength $\lambda_p$ does not get coupled into core 2 and remains confined to core 4 as does that part of the spontaneous fluorescent emission lying between curves 14 and 16.

By way of example, the outside diameter of the fibre may be in the region of 125 μm and the diameter of each core in the region of 3 to 20 μm.

Figure 4:
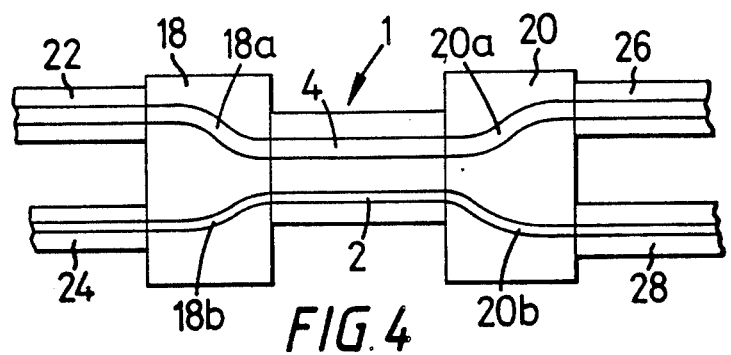
FIG. 4 shows a device in accordance with the invention incorporating a fibre as shown in FIG. 2.

FIG. 4 shows a device, including a length of optical fiber 1 as just described, at each end of which there is secured a respective planar optic element 18,20. Each optic element 18,20 includes two optical paths 18a, 18b,20a,20b. Paths 18a and 20a are in register with the optical core 4 of the fibre and are optically matched with it as closely as possible in terms of dimensions and refractive index distribution thus minimising reflections at the interfaces that could cause undesirable lasing action. The other optical paths 18b and 20b of the planar elements are similarly in register with, and optically matched with, the core 2.

The paths 18a and 18b diverge from each other in a direction away from the fibre so as to provide relatively widely spaced apart optical inputs to which, for example, respective single core fibres 22 and 24 can conveniently be coupled in known manner so that pump energy can be launched into the fibre 1 from fibre 22 via planar element 18 and the optical signal to be amplified can be launched into fibre 1 from fibre 24 via planar element 18. Further single core fibres 26 and 28 can be coupled to planar element 20 respectively for launching further pump energy into core 4 of fibre 1 and for extracting the amplified optical signal from core 2 of fibre 1. If only one pump energy input is required, planar element 20 may be omitted and fibre 28 can be connected direct in register with core 2. Alternatively planar element 18 may be omitted and fibre 24 connected direct in register with core 2, the pump energy then being introduced only through fibre 26.

Figure 5:
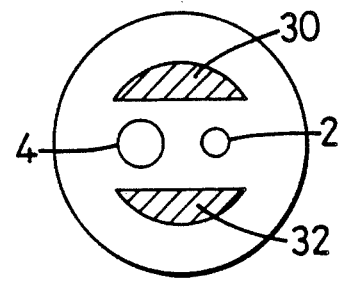
FIG. 5 shows in cross-section a modified fibre structure which enables the centre wavelength of the pass-band to be tuned.

FIG. 5 shows a cross-sectional view through a two-core fibre similar to that shown in the previous figures but in which provision is made for a limited degree of electrical tuning of the centre wavelength of the optical coupling pass-band. This enables the centre wavelength to be adjusted after manufacture if such adjustment should be needed so as to match the centre wavelength to the wavelength of the optical signal to be amplified.

In FIG. 5 two metal electrodes 30 and 32 are incorporated into the structure of the fibre itself. Both of the electrodes are located such that both of the cores 2 and 4 lie between them. Although the siliceous material which is used for the cores 2 or 4 will exhibit only a relatively small Kerr effect in response to the application of an electrical field, nevertheless the field strength can be made relatively high in relation to the voltage applied across the electrodes by incorporating the electrodes within the fibre itself. When a voltage is applied across the electrodes, the Kerr effect results in a change in the refractive index of each of the cores and consequently a shift in the propagation constants of both of them. Consequently, there is a corresponding shift in the centre frequency of the coupling pass-band.

In fact, the Kerr effect causes a differential change in refractive index as between the light polarised perpendicular to the electrodes and that polarised parallel to the electrodes (i.e. vertically and horizontally in relation to the fibre as shown in FIG. 4). The refractive index shift is greater for the light whose plane of polarisation is perpendicular to the electrodes and to take advantage of the greater shift available with this polarisation, the fibre may be fed initially only with light having this polarisation. Alternatively, light polarised parallel to the electrodes may be filtered out at the output end of the fibre using an analyser, thus leaving only the light polarised perpendicular to the electrodes.

To further enhance the maximum frequency shift available, soft glasses (e.g. lead, crown or flint glass) may be used for the cores and cladding, these having a greater Kerr effect than the harder glasses usually used for optical fibre cores and cladding.

Figure 6:
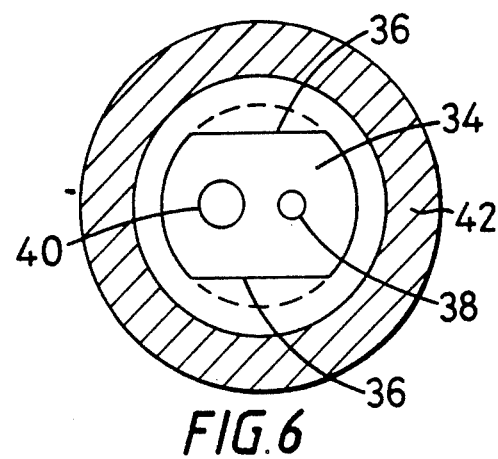
FIG. 6 illustrates a stage in the manufacture of an optical fibre structure as shown in FIG. 5.

FIG. 6 is useful in explaining the manufacture of a fibre structure as shown in FIG. 5. Two core rods are manufactured, for example by depositing glass material having the appropriate characteristics for the particular core inside respective silica support tubes using a modified chemical vapour deposition (MCVD) process. Most of the support tube material is then etched away so as to leave relatively little cladding material on the central optical core material, since the optical cores will need to be relatively close together. The two core rods are then elongated whilst heated in an electric furnace and are drawn to a few millimeters diameter.

A high purity silica rod 34 which is initially of circular cross-section has flats 36 machined on opposite sides of it and two bores 38 and 40 ultrasonically machined axially through it.

The two drawn-down core rods, which are drawn down to a diameter which matches the bores 38 and 40 respectively, are then inserted in these bores and the composite assembly is inserted into a silica tube 42. The entire assembly is then drawn down to a diameter sufficiently small to ensure single mode operation at the optical signal wavelength.

The resulting fibre is as shown in FIG. 5 but with spaces where the electrodes 30 and 32 are shown. These spaces are filled with a low melting point metal such as Wood's metal or an Indium/Gallium mixture, by enclosing the fibre length in a heated enclosure with one end in the liquid metal and simultaneously applying pressure at that end and vacuum at the opposite end of the fibre. The liquid metal is thus pumped into the spaces and solidifies to form the electrodes 30 and 32 when the fibre is cooled.

Figure 7:
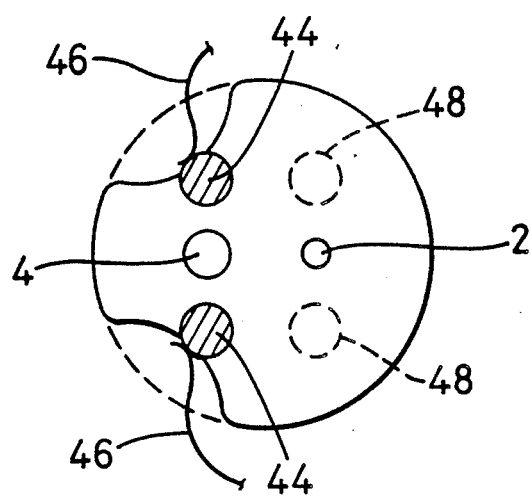
FIG. 7 shows a further type of electrically tunable optical fibre structure.

FIG. 7 shows a further form of electrically tunable fibre in accordance with the invention in which only core 4 is located between electrodes, these being indicated by reference numeral 44. This structure may be manufactured in a similar way to that of FIG. 6 but, instead of flats 36 being machined on the rod 34, two additional holes are bored through it ultrasonically on each side of the bore 40. These are then filled with metal to form the electrodes 44 after the fibre has been drawn. With this structure, the application of a voltage between the electrodes 44 will shift only one of the propagation constants so that a different, and potentially greater, amount of centre wavelength shift can be obtained for a given applied voltage, compared with the FIG. 5 structure.

For the purpose of applying a voltage across the electrodes 30 and 32 in FIG. 5, or 44 in FIG. 7, part of the cladding of the fibre may be locally etched away using hydrogen fluoride until surface regions of the electrodes are exposed, and then fine electrical leads 46 may be ultrasonically welded to the electrodes, this being illustrated in FIG. 7 where the part of the cladding removed by etching is illustrated in broken lines.

FIG. 7 also shows in broken lines a second pair of electrodes 48 which may be located on opposite sides of the core 2, so that the propagation constants of the two cores may be controlled independently of each other if desired.

We claim:

1. An optical fibre structure usable in amplifying optical signals, comprising a length of optical fibre (1) which includes two uniformly spaced monomode optical cores (2,4) located within a common cladding (6) so as to provide two optical guidance paths, the optical characteristics of at least the cores being different and providing the two guidance paths with different propagation constants, the values of such propagation constants being the same for a predetermined coupling wavelength, characterised in that one of the cores (4) includes a fluorescent material capable of producing stimulated emission at a wavelength substantially the same as said predetermined coupling wavelength.

2. An optical fibre structure as claimed in claim 1, characterised in that the fluorescent material will produce stimulated emission substantially at a wavelength used in optical telecommunications transmissions.

3. An optical fibre structure as claimed in claim 1 or claim 2, characterised in that the length of optical fibre has a length equal to an integral number times the coupling beat length, between the two cores, of optical energy having a wavelength used in optical telecommunications transmission.

4. An optical fibre structure as claimed in any one of claims 1 or 2, characterised in that the fluorescent material is erbium.

5. An optical fibre structure as claimed in claim 1, characterised in that the fluorescent material is a rare earth dopant.

6. An optical fibre structure as claimed in claim 5, characterised in that the rare earth dopant is neodymium.

7. A method of amplifying an optical signal using an optical fibre structure as claimed in claim 1, comprising arranging for the wavelength ($\lambda_s$) of the optical signal, the fluorescent wavelength of said material in said one core, and said predetermined coupling wavelength all to be substantially the same, applying an electrical field to at least one of the cores whereby to alter its propagation constant by the electrooptic effect and hence alter said coupling wavelength, launching optical pump energy having a different wavelength ($\lambda_p$) into said one core to pump the fluorescent material, launching the optical signal into the other core so that the optical signal transfers repeatedly between the two cores due to optical coupling and, when in said one core gives rise to stimulated emission substantially at its own wavelength from the fluorescent material thereby becoming amplified, and extracting the amplified optical signal from the fibre structure when it is in said other core.

8. A method of amplifying an optical signal as claimed in claim 7 characterised in that the optical pump energy is launched into both ends of said one core.

9. A method of amplifying an optical signal using an optical fibre structure as claimed in claim 1, comprising arranging for the wavelength ($\lambda_s$) of the optical signal, the fluorescent wavelength of said material in said one core, and said predetermined coupling wavelength all to be substantially the same, launching optical pump energy having a different wavelength ($\lambda_p$) into said one core to pump the fluorescent material, launching the optical signal into the other core so that the optical signal transfers repeatedly between the two cores due to optical coupling and, when in said one core gives rise to stimulated emission substantially at its own wavelength from the fluorescent material thereby becoming amplified, and extracting the amplified optical signal from the fibre structure when it is in said other core.

10. A device for amplifying an optical signal, comprising an optical fibre structure as claimed in claim 1 having, at at least one end a planar optic element (18,20) which includes two optical paths (18a, 18b) which are optically matched with, and are at one end positioned in register with, respective ones (4,2) of the fibre cores, the two optical paths of the planar element diverging in a direction away from the fibre, whereby to provide relatively widely spaced apart optical input or output means leading to or from the fibre cores.

11. A device as claimed in claim 10 characterised in that the optical fibre structure has such a planar optic element at each end.

12. A device as claimed in claim 10 or 11 wherein, in the fibre, two electrodes (30,32;44) are provided within the cladding and are located with at least one core (4) between them for applying an electrical field to that core whereby to alter its propagation constant by the electro-optic effect and hence to alter said coupling wavelength, the device thereby being tunable.

13. An optical fibre structure usable in amplifying optical signals, comprising a length of optical fibre (1) which includes two uniformally spaced monomode optical cores (2,4) located within a common cladding (6) so as to provide two optical guidance paths, the optical characteristics of at least the cores being different and providing the two guidance paths with different propagation constants, the values of such propagation constants being the same for a predetermined coupling wavelength and one of the cores (4) including a fluorescent material capable of producing stimulated emission, two electrodes (30,32;44) within the cladding and disposed with at least one core (4) between them for applying an electrical field to that core whereby to alter its propagation constant by the electrooptical effect and hence to alter said coupling wavelength, the structure thereby being tunable.

14. An optical fibre structure as claimed in claim 13 characterised in that the two electrodes (30,32) are located with both cores (2,4) between them.

15. An optical fibre structure as claimed in claim 13, characterised in that the two electrodes (44) are located with only one (4) of the cores between them.

16. An optical fibre structure as claimed in claim 15, comprising two further electrodes (48) located with the other core (2) between them.

17. An optical fibre structure as claimed in any one of claims 14 to 16 or 13 wherein at least said one core is of a soft glass exhibiting a relatively large electro-optic effect.

18. An optical fibre structure as claimed in claim 17 wherein the common cladding is of a soft glass exhibiting a relatively large electro-optic effect.

* * * * *